United States Patent
Moser

(10) Patent No.: US 9,104,567 B2
(45) Date of Patent: Aug. 11, 2015

(54) MEMORY-LEAK IDENTIFICATION

(75) Inventor: Martin Moser, Speyer (DE)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 13/338,706

(22) Filed: Dec. 28, 2011

(65) Prior Publication Data

US 2013/0173961 A1 Jul. 4, 2013

(51) Int. Cl.
*G06F 9/44* (2006.01)
*G06F 11/07* (2006.01)

(52) U.S. Cl.
CPC .................................. *G06F 11/0751* (2013.01)

(58) Field of Classification Search
CPC .................................................. G06F 11/0751
USPC ......................................................... 717/130
See application file for complete search history.

(56) References Cited

U.S. PATENT DOCUMENTS

| | | | | |
|---|---|---|---|---|
| 7,313,661 B1 * | 12/2007 | Dmitriev | ........................ | 711/159 |
| 7,325,106 B1 * | 1/2008 | Dmitriev et al. | .............. | 711/159 |
| 2005/0204342 A1 * | 9/2005 | Broussard | ...................... | 717/124 |
| 2006/0253845 A1 * | 11/2006 | Achanta et al. | ................ | 717/151 |
| 2007/0255774 A1 * | 11/2007 | Topchiyski | .................... | 707/206 |
| 2007/0255775 A1 * | 11/2007 | Manolov et al. | .............. | 707/206 |
| 2008/0243968 A1 * | 10/2008 | Schmelter et al. | ............. | 707/206 |
| 2010/0153475 A1 * | 6/2010 | Zedlitz et al. | ................. | 707/814 |
| 2011/0029822 A1 * | 2/2011 | Moser | ............................. | 714/45 |
| 2013/0173961 A1 * | 7/2013 | Moser | ............................. | 714/32 |

OTHER PUBLICATIONS

Novark et al., Applicant Provided Prior Art Reference #1.*
Novark et al, Efficiently and Precisely Locating Memory Leaks and Bloat, PLDI (2009), Applicant Provided Prior Art Reference.*
Novark, Gene, et al., "Efficiently and Precisely Locating Memory Leaks and Bloat", PLDI, [Online]. Retrieved from the Internet: <URL: http://www.cs.umass.edu/~emery/pubs/pldi101-novark.pdf>, (2009), 11 pgs.

* cited by examiner

*Primary Examiner* — Don Wong
*Assistant Examiner* — Theodore Hebert
(74) *Attorney, Agent, or Firm* — Schwegman Lundberg & Woessner, P.A.

(57) ABSTRACT

A memory-leak source in a data structure can be identified by counting insertions into the data structure and deletions from the data structure for locations in the execution path of a computer program. These insertion and deletion values can be used to identify at least one location as a memory-leak source that corresponds to an imbalance between insertions and deletions during the execution of the computer program.

21 Claims, 15 Drawing Sheets

```
1   public class Tracking { static MyHashMap  constructorMap = new MyHashMap();
        static String     itemClassName;
5       static MyHashMap  itemMap        = new MyHashMap();
        static int        sampleCount;
        static int        warmUpCount;

public Tracking(String itemClassName, int sampleCount, int
10  warmUpCount) {
            Tracking.itemClassName = itemClassName;
            Tracking.sampleCount   = sampleCount;
            Tracking.warmUpCount   = warmUpCount;
        }
15
        public static void updateItemCount(Object object,
     StackTraceElement[] stackTrace,
                                            int delta) {
            MyHashMapEntry e = Tracking.itemMap(object, stackTrace);
20          if (e != null) {
                e.increment(delta);
            } else {
                Tracking.itemMap(object, stackTrace) = new MyHashMapEntry(e);
            }
25          return;
        } public static String getItemClassName() {
            return Tracking.itemClassName;
30      }
```

CONTINUED FROM FIG. 3A

```
1   public static void incrementConstructorCount(StackTraceElement[]
    stackTrace) {
        MyHashMapEntry e = Tracking.constructorMap(stackTrace);
        if (e != null) {
            e.increment();
        } else {
            Tracking.constructorMap(stackTrace) = new MyHashMapEntry(e);
        }
        return;
    } public static void decrementSampleCount() {
        Tracking.sampleCount--;
        return;
15  } public static int getSampleCount() {
        return Tracking.sampleCount;
    }
20
    public static void resetSampleCount() {
        Tracking.sampleCount = Tracking.startSampleCount;
        return;
    }
25
    public static void decrementWarmUpCount() {
        Tracking.warmUpCount--;
        return;
    }
    public static int getWarmUpCount() {
        return Tracking.warmUpCount;
    }

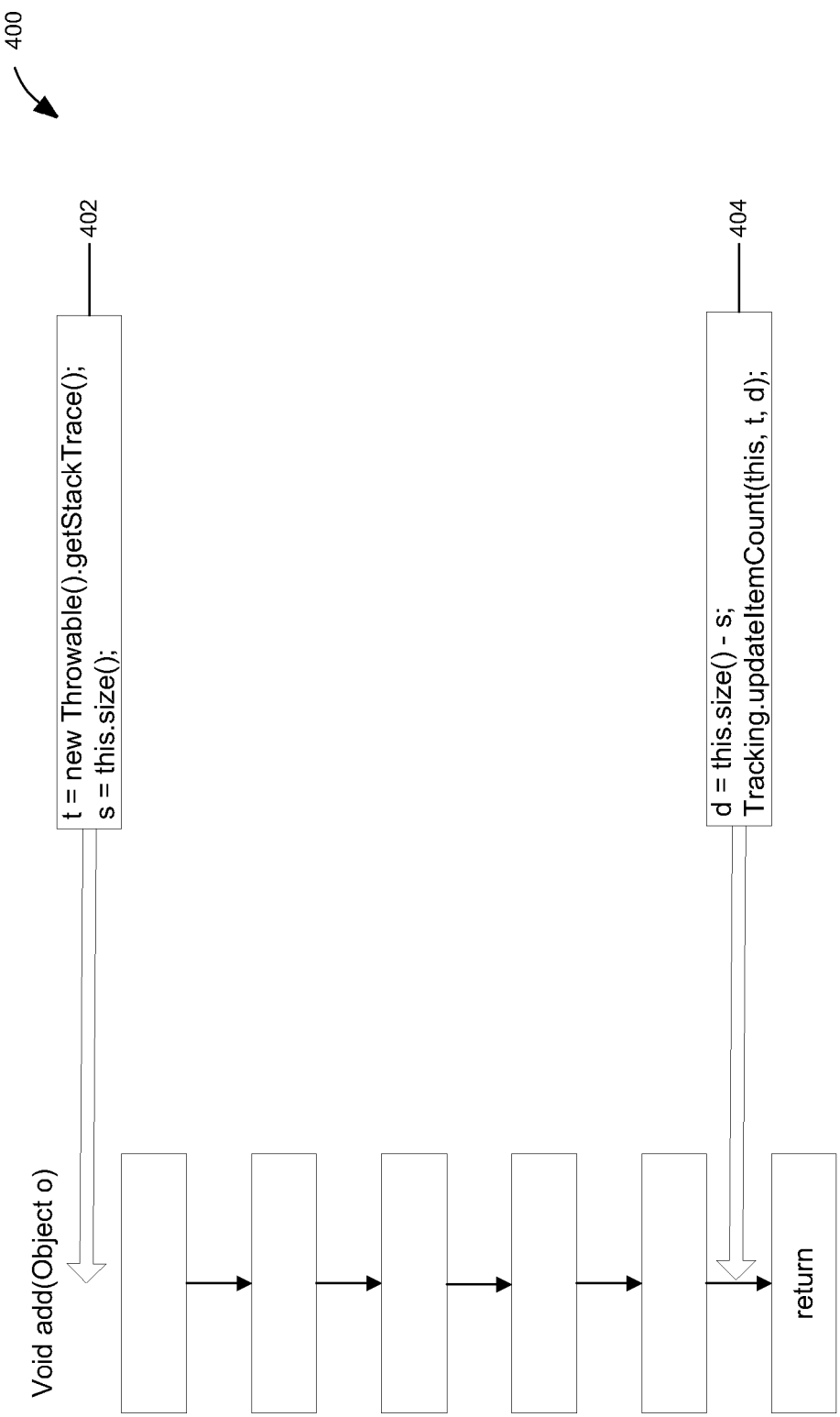

MEMORY-LEAK IDENTIFICATION

BACKGROUND

1. Technical Field

The present disclosure relates generally to computing and more particularly to memory management in computer systems.

2. Description of Related Art

Software platforms that employ implicit memory management provide dynamic flexibility to software developers by enabling users to easily allocate memory while relying on system functions to deallocate memory corresponding to objects that are no longer in use. However, when memory that should be deallocated is referenced by an existing pointer, also known as a dangling pointer or a wild pointer, the deallocation process is typically thwarted and memory allocations may grow indefinitely without corresponding deallocations, a condition known as a memory leak. Although the data structure corresponding to a memory leak can be identified by existing methods, the program elements that caused the memory leak during execution are not so easily identified as a source of the memory leak. Thus, there is a need for improved memory-leak identification including sources of memory leaks.

BRIEF DESCRIPTION OF THE DRAWINGS

FIGS. 3A and 3B show a pseudo-code listing related to the embodiment of FIG. 1

FIG. 4 is a diagram that illustrates code insertion for the embodiment of FIG. 1

DETAILED DESCRIPTION OF EXAMPLE EMBODIMENTS

Overview

Certain embodiments enable the identification of a memory-leak source in a data structure by counting insertions into the data structure and deletions from the data structure for locations in the execution path of a computer program and using these values to identify at least one location as a memory-leak source that corresponds to an imbalance between insertions and deletions during the execution of the computer program.

One embodiment relates to a method of identifying a memory leak in a computer program. The method includes receiving a listing of the computer program, where the computer program includes program elements that operate on a data structure that includes one or more objects as components of the data structure. At least one object-adding program element that adds at least one object to the data structure is identified, and at least one object-removing program element that removes at least one object from the data structure is identified. Data-structure bookkeeping code is injected into the at least one object-adding program element and the at least one object-removing program element, where the data-structure bookkeeping code operates to track a change in a size of the data structure and a corresponding location in an execution path of the computer program. The computer program is then executed with the injected data-structure bookkeeping code to determine a first cumulative change in the size of the data structure at a first location in the execution path of the computer program by summing tracked changes at the first location. The first cumulative change is then used to identify the first location as a source of the memory leak in the data structure, the memory leak corresponding to an increasing allocation of memory beyond a threshold value for leaking memory.

Another embodiment relates to an apparatus for carrying out the above-described method, where the apparatus includes a computer for executing instructions related to the method. For example, the computer may include a processor for executing at least some of the instructions. Additionally or alternatively the computer may include circuitry or other specialized hardware for executing at least some of the instructions. In some operational settings, the apparatus may be configured as a system that includes one or more units, each of which is configured to carry out some aspects of the method either in software, in hardware or in some combination thereof. At least some values for the results of the method can be saved for later use in a computer-readable medium, including memory units and storage devices. Another embodiment relates to a computer-readable medium that stores (e.g., tangibly embodies) a computer program for carrying out the any one of the above-described methods with a computer. In these ways aspects of the disclosed embodiments enable improved memory-leak identification including sources of memory leaks.

Embodiments

Figure 1:
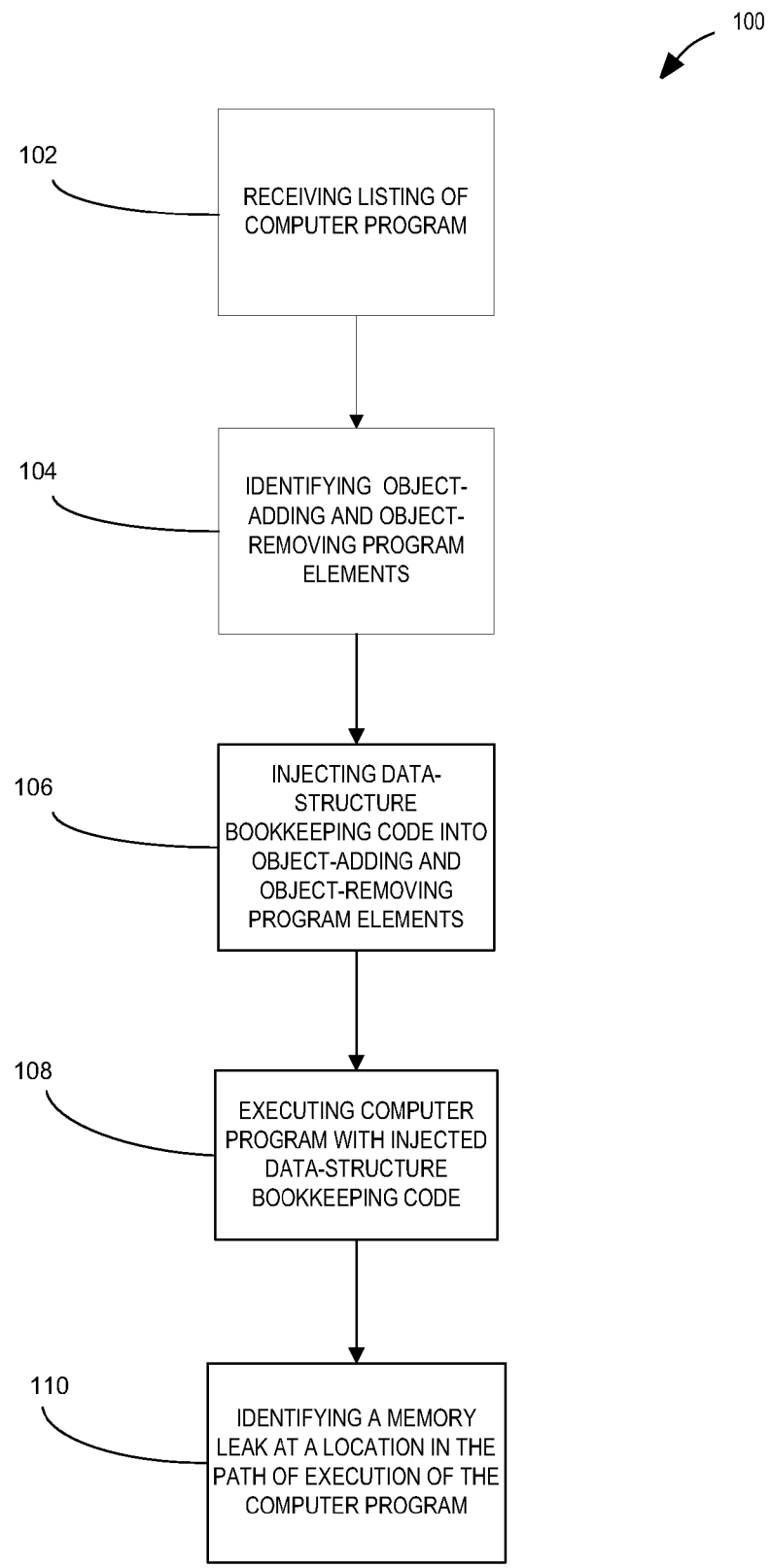
FIG. 1 is a flowchart that shows a method of identifying a memory leak in a data structure according to an example embodiment.

FIG. 1 is a flowchart that shows a method 100 of identifying a memory leak in a data structure according to an example embodiment. A first block 102 includes receiving (e.g., accessing) a listing of a computer program, where the computer program includes program elements that create the data structure and operate on the data structure to include one or more objects as components of the data structure. The data structure is typically a container (e.g., a list structure or a tree structure). The computer program may be written in a conventional software platform that provides implicit memory management such as Java or .Net.

A second block 104 includes identifying at least one object-adding program element that adds at least one object to the data structure and at least one object-removing program element that removes at least one object from the data structure. For example, the container interface in Java includes an add method that adds an object to a data structure and a remove method that removes an object from the data structure. In this case the identification of object-adding and object-removing methods is made easier by the structure of the container interface. Alternatively, user-defined methods may be used to identify where objects are added to the data structure or removed from the data structure.

A third block 106 includes injecting data-structure bookkeeping code into the at least one object-adding program element and the at least one object-removing program element, where the data-structure bookkeeping code operates to track a change in a size of the data structure and a corresponding location in an execution path of the computer program. An example embodiment that employs the Java container interface is discussed below with reference to FIG. 4. In addition to the add method and the remove method, the container interface also provides a size method that determines the size of the data structure. Additionally, the Java Throwable class can be used to determine a stack trace (e.g., dynamic call stack) to identify each location in the execution path where an addition or removal occurs.

A fourth block 108 includes executing the computer program with the injected data-structure bookkeeping code to determine a first cumulative change in the size of the data structure at a first location in the execution path of the computer program by summing tracked changes at the first location.

A fifth block 110 then includes using the first cumulative change to identify the first location as a source of the memory leak in the data structure, where the memory leak corresponds to an increasing allocation of memory beyond a threshold value for leaking memory. In the cases where a single class structure or grouping is used for all additions to the data structure or removals from the data structure, a single location (e.g., the first location) can be used to identify the memory leak. This desirable programming practice makes it easier to identify the source of the memory leak since all additions and removals can be referenced to one location corresponding to the single class structure. When additions and removals may occur at multiple locations (or class structures), the results from these locations can be combined together to identify the collective source of the memory leak.

Figure 2:
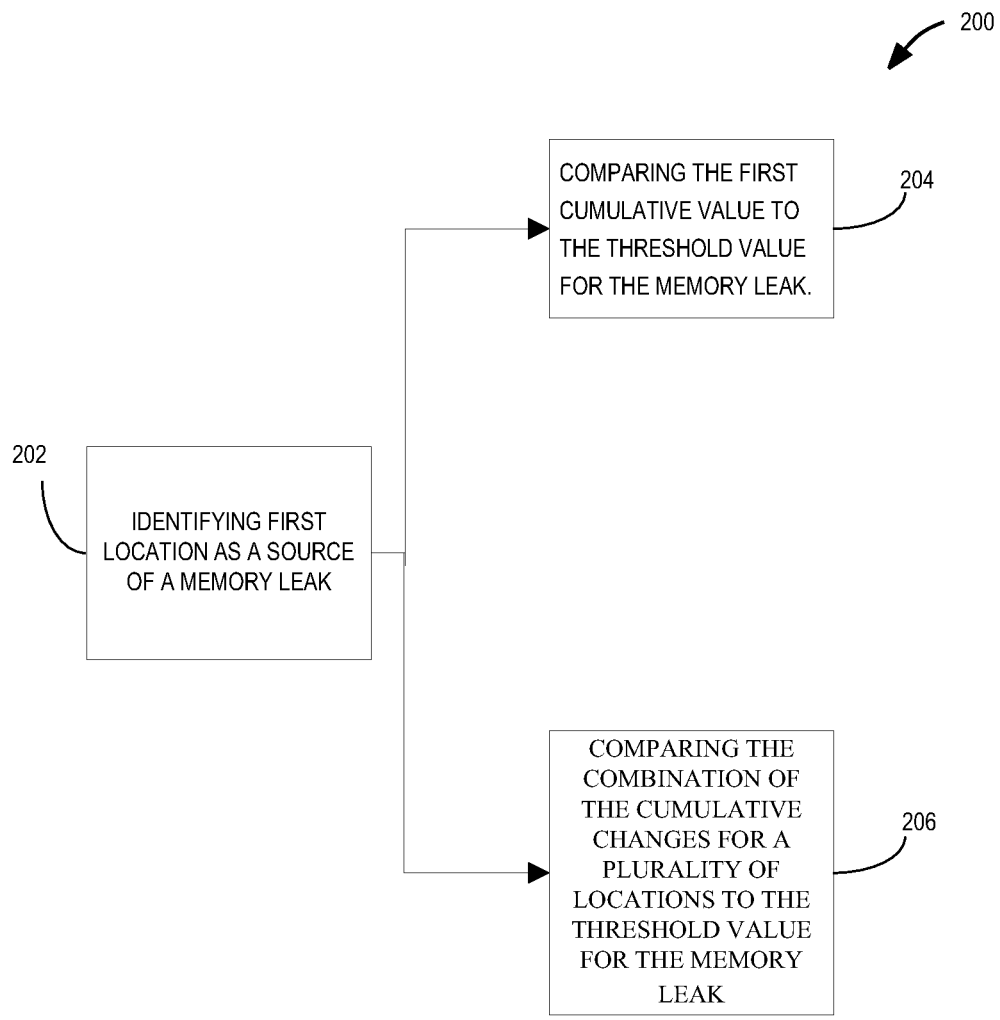
FIG. 2 is a flowchart that shows a method with alternative choices for identifying the source of the memory leak for the embodiment of FIG. 1.

FIG. 2 is a flowchart that shows a method 200 with alternative choices for identifying the source of the memory leak for the embodiment of FIG. 1. The initial block 202 focuses on identifying the first location as the source of a memory leak in the data structure (e.g., as in block 110 of FIG. 1). As shown in FIG. 2, two alternative choices are provided. A first choice 204 includes comparing the first cumulative value to the threshold value for leaking memory. This option corresponds to the case where a single class structure corresponding to a single location is used for all additions and removals. A second choice 206 includes comparing the combination of the cumulative changes to the threshold value for leaking memory, the combination of the locations including the first location. In this case, multiple locations are collectively characterized as the source of the memory leak. (Note that the words first and second are used here and elsewhere for labeling purposes only and are not intended to denote any specific spatial or temporal ordering. Furthermore, the labeling of a first element does not imply the presence a second element.)

In this way, calls from program elements that may cause a memory leak can be identified by balancing the insertions and deletion for each container instance. Adding up the changes (e.g., deltas) for each container instance can then identify the source or sources of the memory leak. For example, if an instance of some class C calls the leaking container instance i a certain number of times to insert elements but calls much less frequently to remove items, class C is most likely the root cause of the memory leak.

As discussed above, aspects of this embodiment are supported by two aspects of conventional programming style. First, data structures that serve as containers (e.g., lists, trees) can implement the Java collection interface or equivalent programming structures. For example, the Java collection interface includes methods for adding objects, removing objects, and determining sizes of objects. Secondly, an object that is inserted into a container in one class should also be removed from the container in the same class. Restricting additions and removals to a single class or programming structure facilitates the identification of the source of a memory leak since relevant locations are referenced to this class or programming structure.

FIGS. 3A and 3B show a pseudo-code listing related to the embodiment of FIG. 1. Aspects of this pseudo-code, which defines a Tracking class that utilizes the Java constructs discussed above, are used in embodiments discussed below. In FIG. 3A the parameter definitions and static variables of the Tracking class are defined at lines 1-7, and the constructor of the Tracking class is defined at lines 9-14. Item counts are updated by the updateItemCount method at lines 16-26 of FIG. 3A (e.g., as used in FIG. 4). To limit which objects are counted, a class name can be accessed by the getItemClassName method at lines 28-30 of FIG. 3A (e.g., as used in FIG. 6). Locations where objects are created can by identified by the incrementConstructorCount method at lines 1-10 of FIG. 3B (e.g., as used in FIG. 12). A sampling counter can be used to restrict sampling as given by the decrementSampleCount method at lines 12-15 of FIG. 3B, the getSampleCount method at lines 17-19 of FIG. 3B, and the resetSampleCount method at lines 21-24 of FIG. 3B (e.g., as used in FIG. 8). A warm-up counter can also be used to restrict sampling as given by the decrementWarmUpCount method at lines 26-29 of FIG. 3B and the getWarmUpCount method at lines 31-33 of FIG. 3B (e.g., as used in FIG. 10).

FIG. 4 is a diagram 400 that illustrates code insertion (e.g., byte code injection) for the embodiment of FIG. 1. The updateItemCount method of the Tracking class is used here (cf. lines 16-26 of FIG. 3A). The data-structure bookkeeping code includes a first code element 402 at or near the beginning of an add method and a second code element 404 at or near the end of the add method. The getStackTrace method of the Java Throwable class is used here to determine a location in the path of execution as an element of the dynamic call stack. The first code element 402 includes a stack trace t that identifies a location in the path of execution and the size s of the data structure at the beginning of the method. The second code element 404 tracks the difference d in the size of the data structure (from the beginning to the end of the method) with reference to the location t. As discussed above, the Java container interface also includes a remove method for which the same code injections can be similarly applied.

Figure 5:
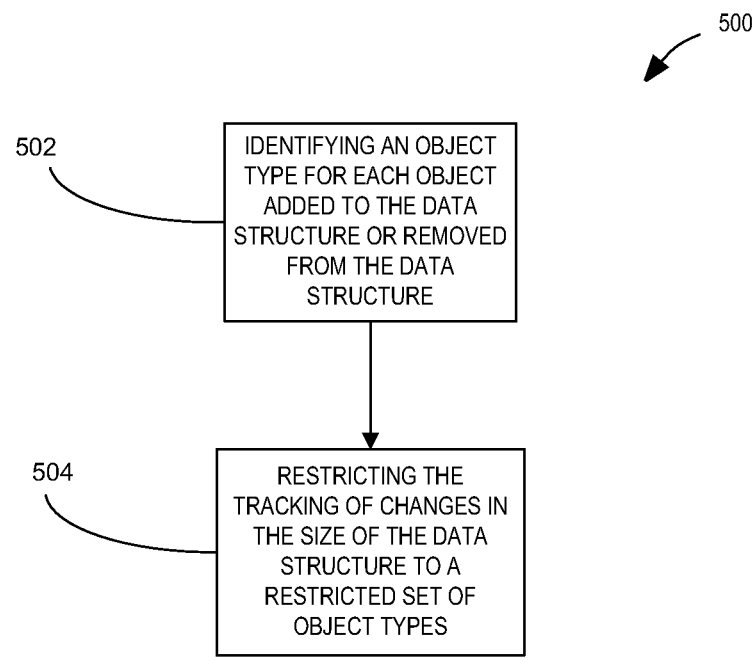
FIG. 5 is a flowchart that shows an embodiment related to the embodiment of FIG. 1 where the tracking of changes in the data structure is restricted based object types.

In some operational settings, only certain types or classes of objects need to be tracked. FIG. 5 is a flowchart that shows a method 500 related to the embodiment of FIG. 1 where the tracking of changes in the data structure is restricted based on object types. A first block 502 includes identifying an object type for each object added to the data structure or removed from the data structure. A second block 504 includes restricting the tracking of changes in the size of the data structure to a restricted set of one or more object types.

Figure 6:
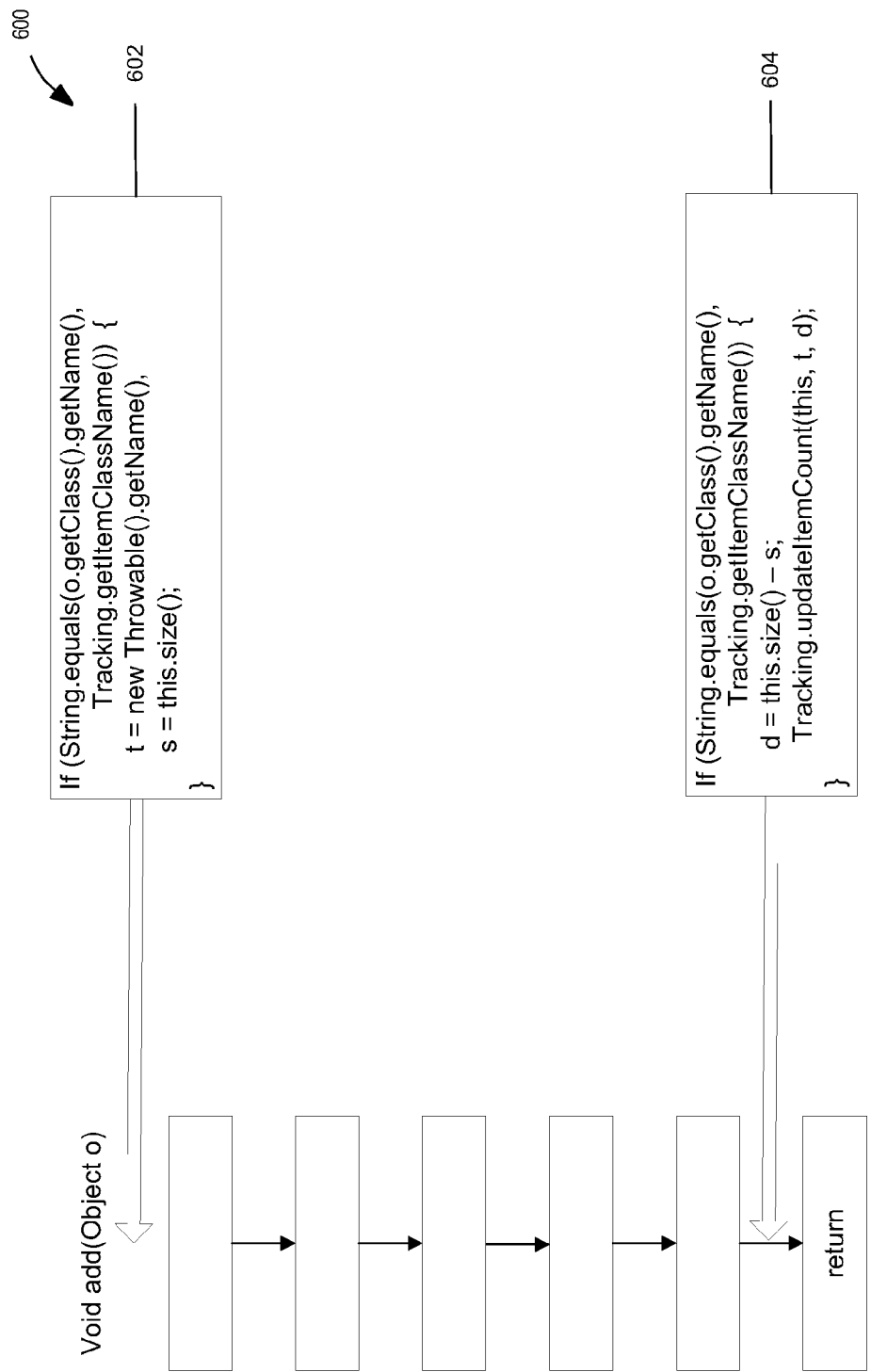
FIG. 6 is a diagram that illustrates code insertion for the embodiment of FIG. 5.

FIG. 6 is a diagram 600 that illustrates code insertion for the embodiment of FIG. 5. The getItemClassName method of the Tracking class is used here (cf. lines 28-30 of FIG. 3A). Similarly to the embodiment of FIG. 4, the data-structure bookkeeping code includes a first code element 602 at or near the beginning of an add method and a second code element 604 at or near the end of the add method. The first code element 602 modifies the first code element 402 of FIG. 4 by checking the class (e.g., object type) of the object being added to the data structure, and the second code element 604 similarly modifies the second code element 404 of FIG. 4 by again checking the class (e.g., object type) of the object being added to the data structure.

Figure 7:
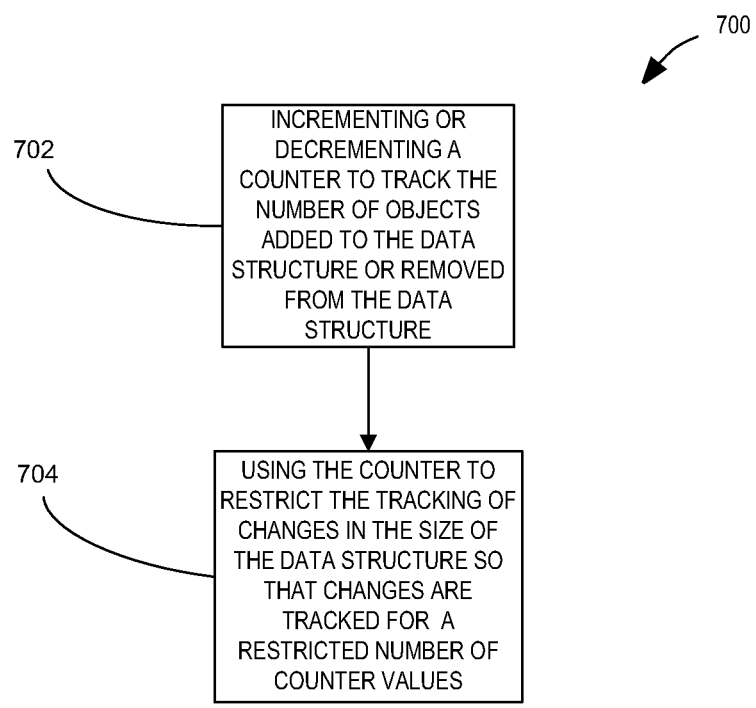
FIG. 7 is a flowchart that shows an embodiment related to the embodiment of FIG. 1 where the tracking of changes in the data structure is restricted based on a counter that is incremented or decremented when objects are added or removed so that changes are tracked for a restricted set of counter values.

In some operational settings, the sampling can be restricted to avoid excessive operations to identify the source of the memory leak. FIG. 7 is a flowchart that shows a method 700 related to the embodiment of FIG. 1 where the tracking of changes in the data structure is restricted based on a counter that is incremented or decremented when objects are added or removed so that changes are tracked for a restricted set of counter values. A first block 702 includes incrementing or decrementing a counter to track a number of objects added to the data structure or removed from the data structure in the first program element. A second block 704 includes using the counter to restrict the tracking of changes in the size of the data structure so that changes are tracked for a restricted set of counter values.

Figure 8:
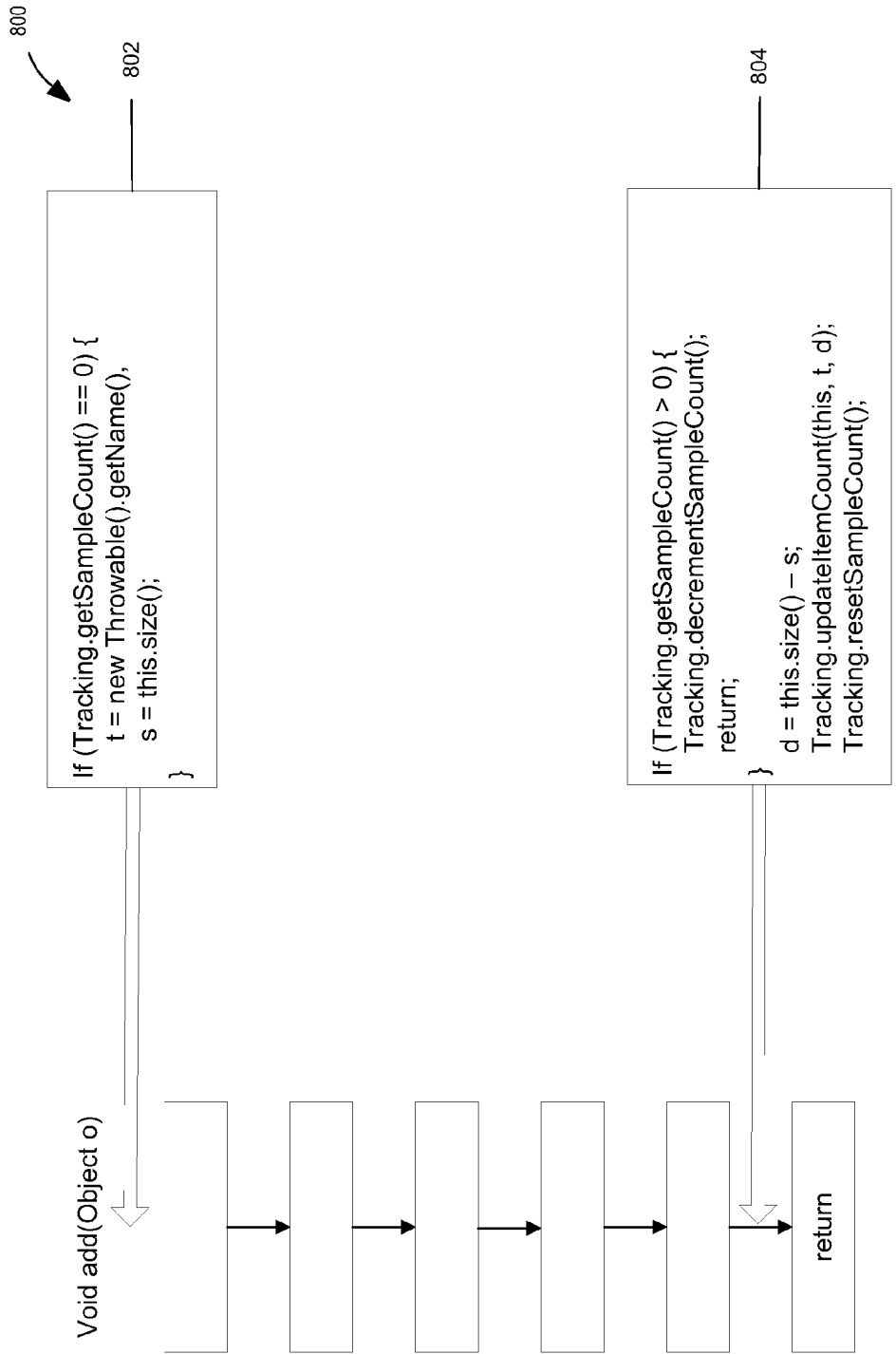
FIG. 8 is a diagram that illustrates code insertion for the embodiment of FIG. 7.

FIG. 8 is a diagram 800 that illustrates code insertion for the embodiment of FIG. 7 by implementing a sampling counter that is initially set to a positive value (e.g., 100) and then decremented. The decrementSampleCount, getSampleCount, and resetSampleCount methods of the Tracking class are used here (cf. lines 12-24 of FIG. 3B). Similarly to the embodiment of FIG. 4, the data-structure bookkeeping code includes a first code element 802 at or near the beginning of an add method and a second code element 804 at or near the end of the add method. The first code element 802 is a modification of the first code element 402 of FIG. 4, and operates to carry out corresponding operations only when the sampling counter is at zero (e.g., Tracking.getSampleCount( )==0). The second code element 804 is a modification of the second code element 404 of FIG. 4. For positive sampling counter values (e.g., Tracking.getSampleCount( )>0), the second code element 804 decrements the counter and returns from the add method. Alternatively, when the sampling counter is at zero, operations corresponding to the code element 404 of FIG. 4 are carried out and the counter is reset to the original positive value (e.g., 100) by a reset operation (e.g., Tracking resetSampleCount( )).

Figure 9:
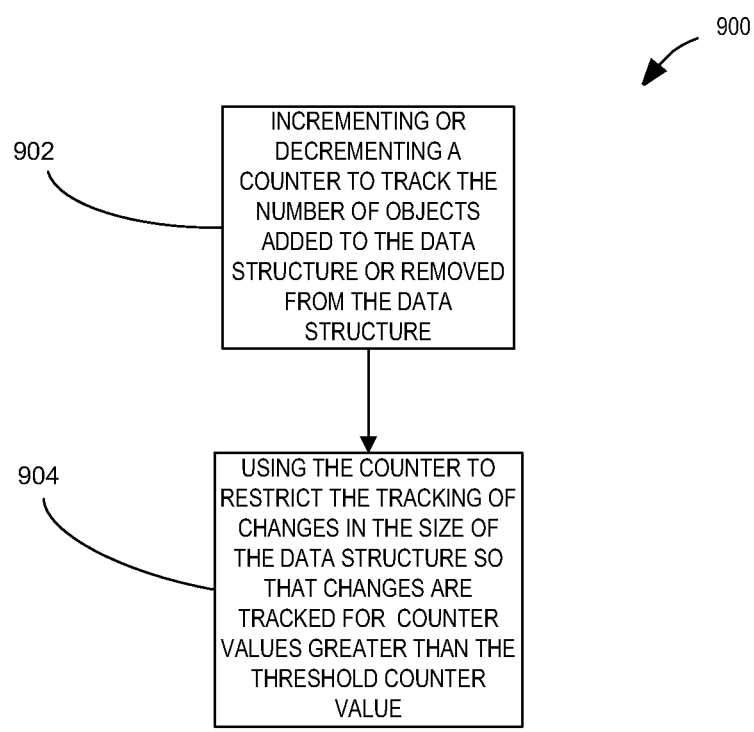
FIG. 9 is a flowchart that shows an embodiment related to the embodiment of FIG. 1 where the tracking of changes in the data structure is restricted based on a counter that is incremented or decremented when objects are added or removed so that changes are tracked for counter values that are greater than a threshold counter value.

In some operational settings, a warm-up counter can also be used to restrict the sampling. FIG. 9 is a flowchart that shows a method 900 related to the embodiment of FIG. 1 where the tracking of changes in the data structure is restricted based on a counter that is incremented or decremented when objects are added or removed so that changes are tracked for counter values that are greater than a threshold counter value. A first block 902 includes incrementing or decrementing a counter to track a number of objects added to the data structure or removed from the data structure in the first program element. A second block 904 includes using the counter to restrict the tracking of changes in the size of the data structure so that changes are tracked for counter values that are greater than a threshold counter value.

Figure 10:
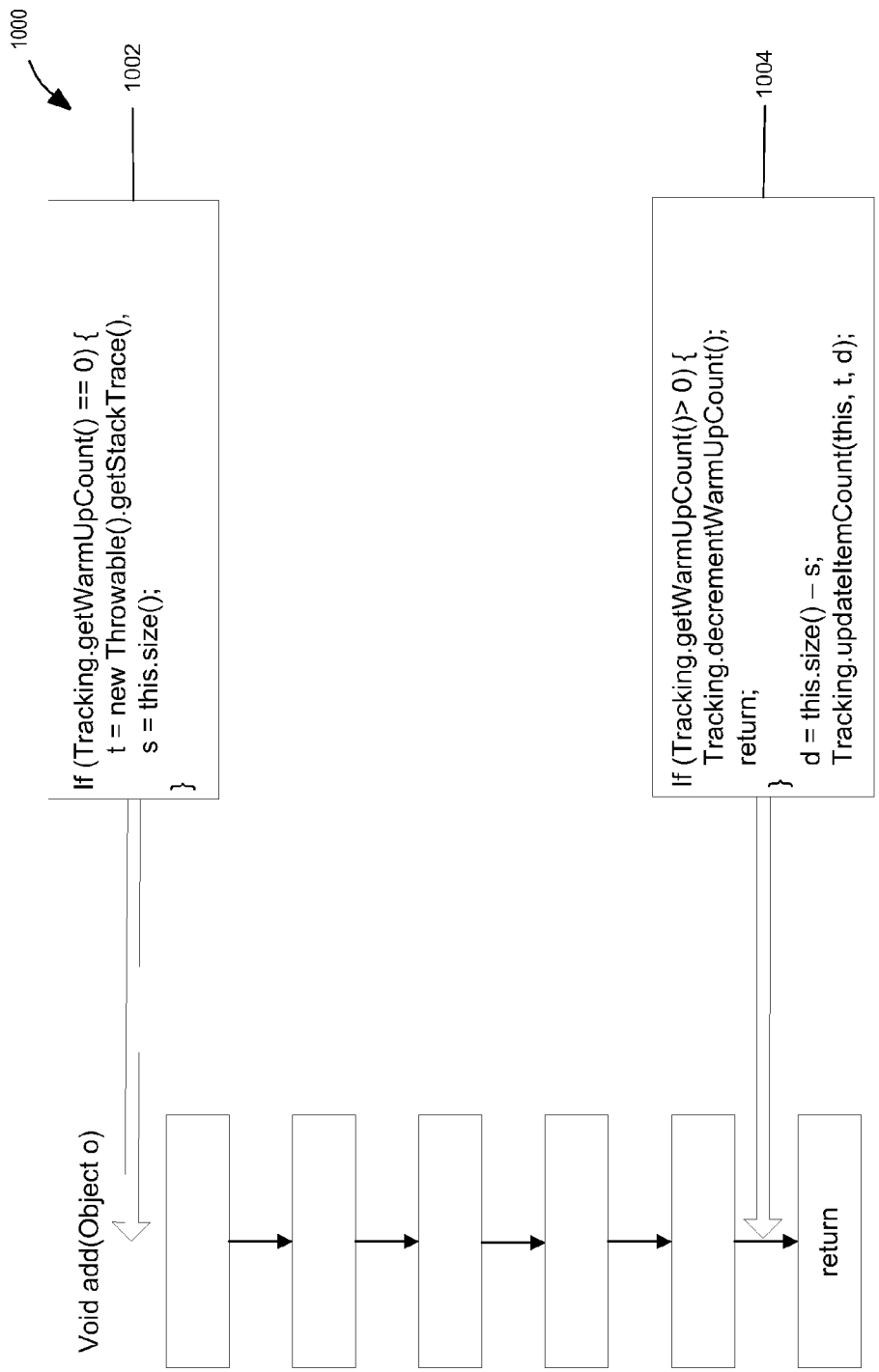
FIG. 10 is a diagram that illustrates code insertion for the embodiment of FIG. 9.

FIG. 10 is a diagram 1000 that illustrates code insertion for the embodiment of FIG. 9 by implementing a warm-up counter that is initially set to a positive value (e.g., 100) and then decremented. The decrementWarmUpCount and getWarmUpCount methods of the Tracking class are used here (cf. lines 26-33 of FIG. 3B). Similarly to the embodiment of FIG. 4, the data-structure bookkeeping code includes a first code element 1002 at or near the beginning of an add method and a second code element 1004 at or near the end of the add method. The first code element 1002 is a modification of the first code element 402 of FIG. 4, and operates to carry out corresponding operations only when the warm-up counter is at zero (e.g., Tracking getWarmUpCount( )==0). The second code element 1004 is a modification of the second code element 404 of FIG. 4. For positive warm-up counter values (e.g., Tracking getWarmUpCount( )>0), the second code element 1004 decrements the counter and returns from the add method. Alternatively, when the warm-up counter is at zero, operations corresponding to the code element 404 of FIG. 4 are carried out. However, compared with the sampling counter employed in FIG. 8, there is no resetting of the counter.

Figure 11:
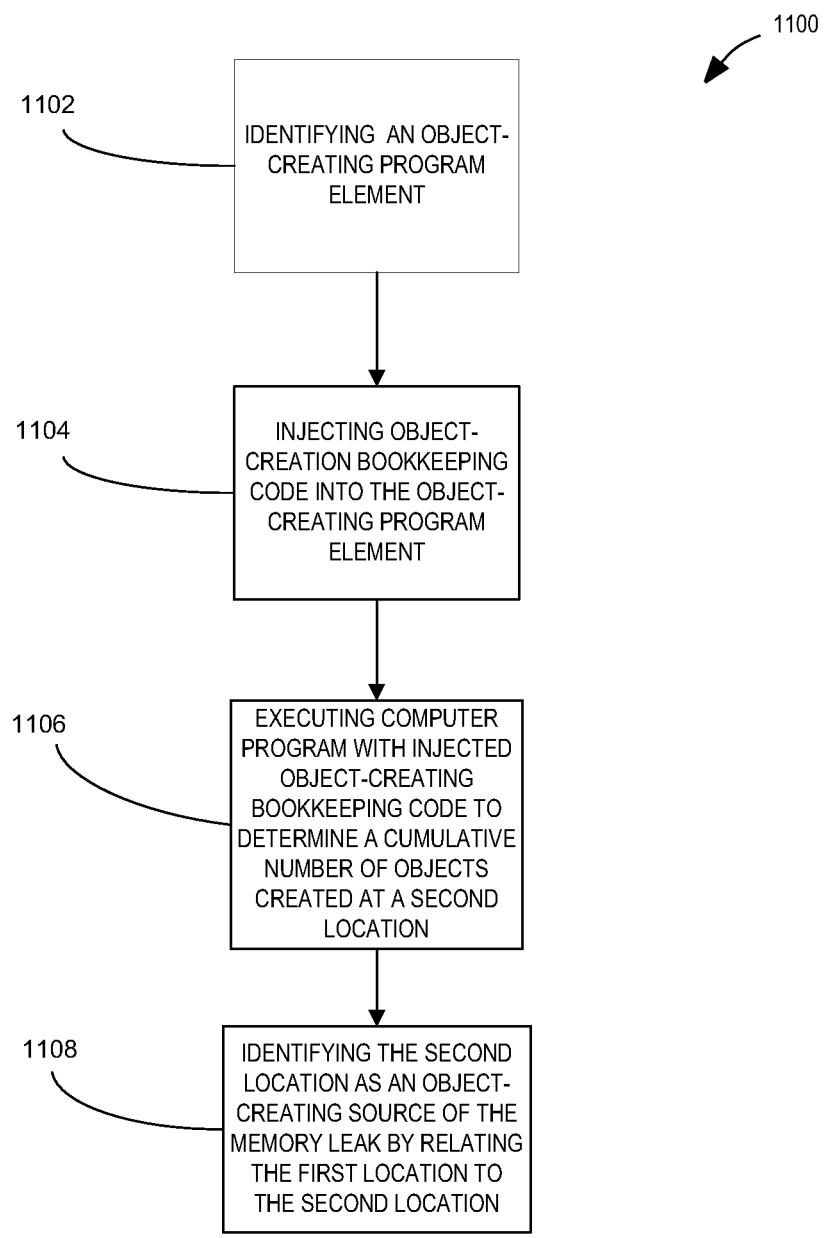
FIG. 11 is a flowchart that shows an embodiment related to the embodiment of FIG. 1 where an object-creating source of the memory leak is identified.

In some operational settings it may be desirable to additionally track the creation of objects that are added to the data structure so that an object-creating source of the memory leak may also be identified. FIG. 11 is a flowchart that shows a method 1100 related to the embodiment of FIG. 1 where an object-creating source of the memory leak is identified. A first block 1102 includes identifying at least one object-creating program element that creates an object for the data structure. A second block 1104 includes injecting object-creation bookkeeping code into the at least one object-creating program element, the object-creation bookkeeping code operating to track a location in the execution path of the computer program where an object is created for the data structure.

A third block 1106 includes executing the computer program with the object-creation bookkeeping code to determine a cumulative number of objects created at a second location in the execution path of the computer program by counting a plurality of objects created at the second location. A fourth block 1108 includes identifying the second location as an object-creating source of the memory leak by relating the first location to the second location.

Figure 12:
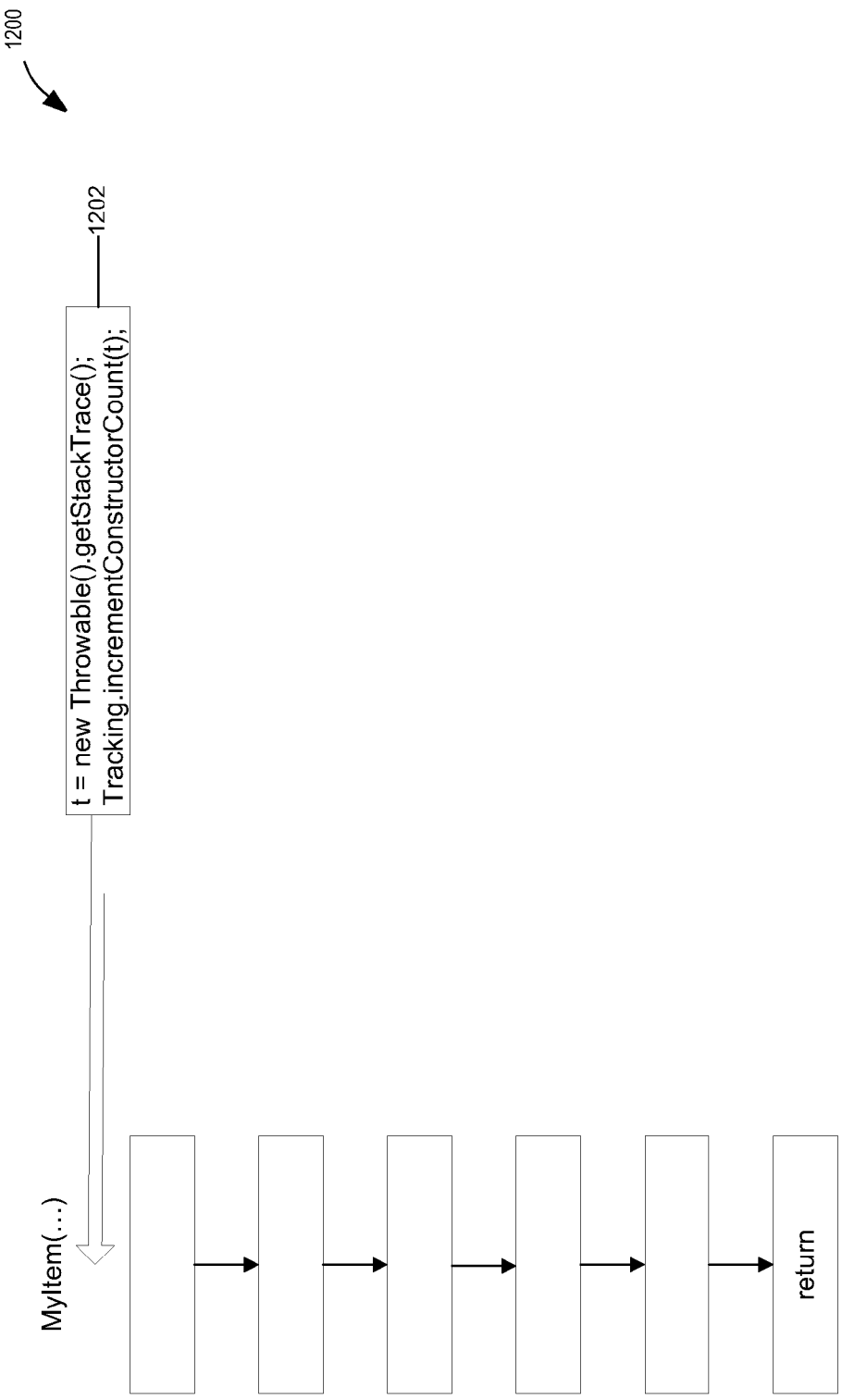
FIG. 12 is a diagram that illustrates code insertion for the embodiment of FIG. 11.

FIG. 12 is a diagram 1200 that illustrates code insertion for the embodiment of FIG. 11. The incrementConstructorCount method of the Tracking class is used here (cf. lines 1-10 of FIG. 3B). The object-creation bookkeeping code includes a first code element 1202 at or near the beginning of a method for creating objects for the data structure. The first code element 1202 includes a stack trace t that identifies a location in the path of execution. A counter corresponding to this location is then incremented to track the number of objects created at this location (e.g., Tracking incrementConstuctorCount(t)).

Figure 13:
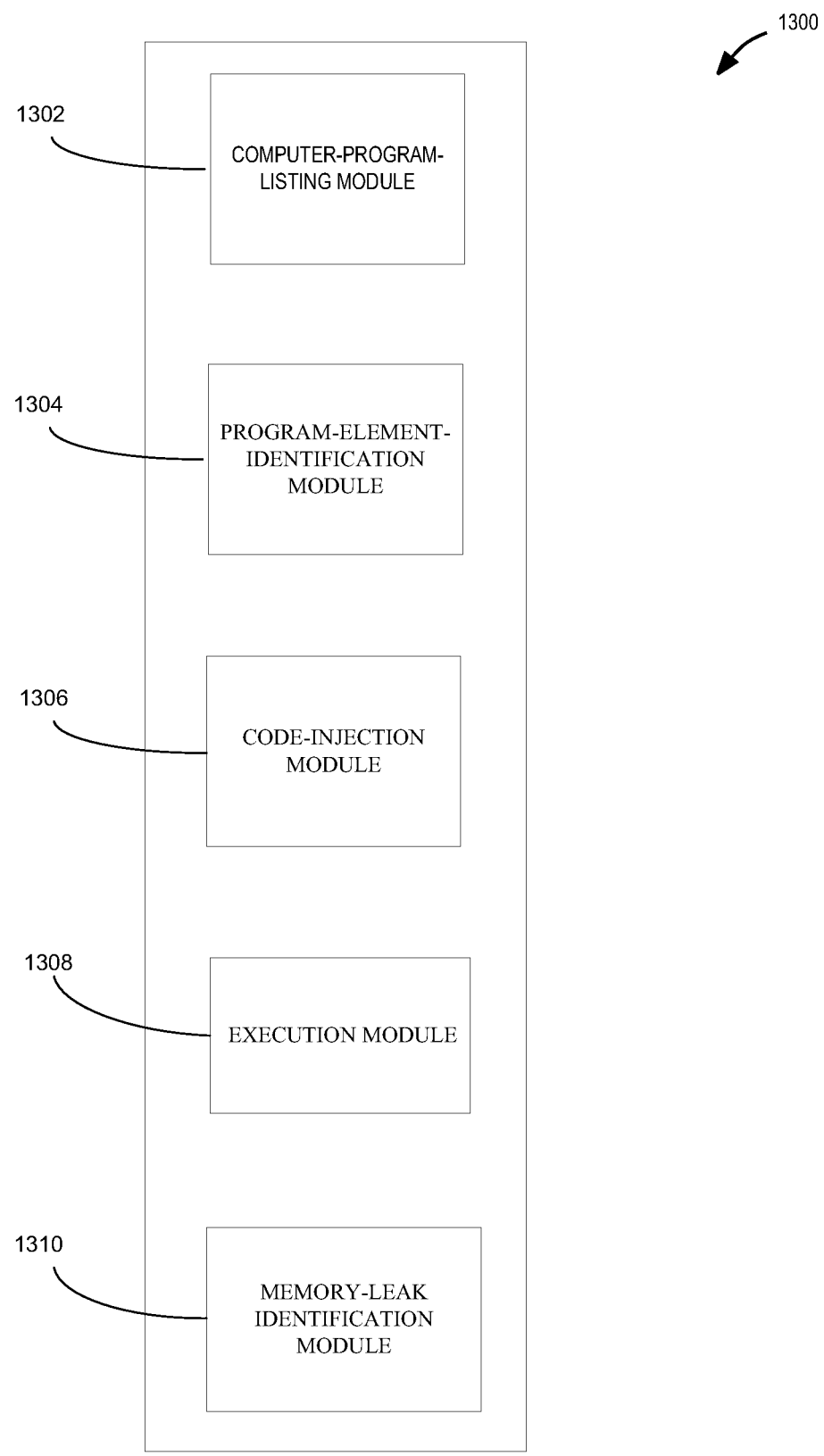
FIG. 13 is a block diagram that shows a schematic representation of an apparatus for an example embodiment.

Any one of the above-described embodiments may also be expressed as an apparatus. FIG. 13 shows a schematic representation of an apparatus 1300, in accordance with an example embodiment to identify a memory leak in a computer program. In this case, the apparatus 1300 includes at least one computer system (e.g., as in FIG. 14) to perform software and hardware operations for modules that carry out aspects of the method 100 of FIG. 1. In accordance with an example embodiment, the apparatus 1300 includes a computer-program-listing module 1302, a program-element-identification module 1304, a code-injection module 1306, an execution module 1308, and a memory-leak-identification module 1310.

The computer-program-listing module 1302 operates to receive a listing of the computer program, the computer program including program elements that operate on a data structure that includes one or more objects as components of the data structure. The program-element-identification module 1304 operates to identify at least one object-adding program element that adds at least one object to the data structure and at least one object-removing program element that removes at least one object from the data structure. The code-injection module 1306 operates to inject data-structure bookkeeping code into the at least one object-adding program element and the at least one object-removing program element, the data-structure bookkeeping code operating to track a change in a size of the data structure and a corresponding location in an execution path of the computer program. The execution module 1308 operates to execute the computer program with the injected data-structure bookkeeping code to determine a first cumulative change in the size of the data structure at a first location in the execution path of the computer program by summing tracked changes at the first location. The memory-leak-identification module 1310 operates to use the first cumulative change to identify the first location as a source of the memory leak in the data structure, the memory leak corresponding to an increasing allocation of memory beyond a threshold value for leaking memory.

Figure 14:
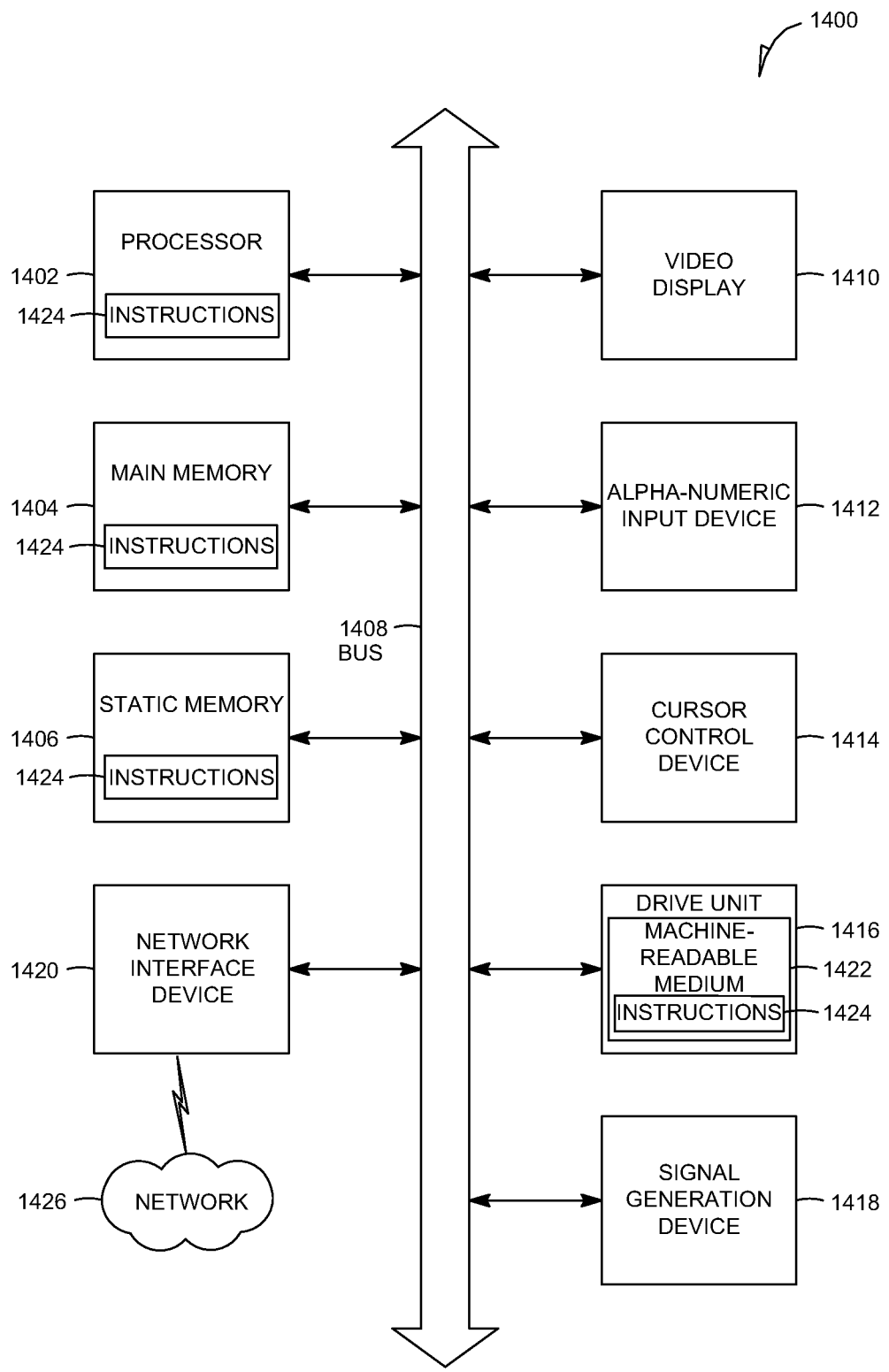
FIG. 14 is a diagram that shows a computer processing system within which a set of instructions for causing the computer to perform any one of the methodologies discussed herein may be executed.

FIG. 14 is a block diagram of a machine in the example form of a computer system 1400 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation device 1414 (e.g., a mouse), a disk drive unit 1416, a signal generation device 1418 (e.g., a speaker) and a network interface device 1420.

In some contexts, a computer-readable medium may be described as a machine-readable medium. The disk drive unit 1416 includes a machine-readable medium 1422 on which is stored one or more sets of data structures and instructions 1424 (e.g., software) embodying or utilizing any one or more of the methodologies or functions described herein. The instructions may also reside, completely or at least partially, within the main memory 1404 and/or within the processor 1402 during execution thereof by the computer system 1400, with the main memory 1404 and the processor 1402 also constituting machine-readable media.

While the machine-readable medium 1422 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 1424. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories and optical and magnetic media. Specific examples of machine-readable or computer-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; Compact Disc Read-Only Memory (CD-ROM) and Digital Versatile Disc Read-Only Memory (DVD-ROM).

The instructions 1424 may further be transmitted or received over a communications network 1426 using a transmission medium. The instructions 1424 may be transmitted using the network interface device 1420 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of identifying a memory leak in a data structure, the method comprising:
   accessing a listing of a computer program, the computer program including program elements that create the data structure and operate on the data structure to include one or more objects as components of the data structure;
   identifying at least one object-adding program element that adds at least one object to the data structure and at least one object-removing program element that removes at least one object from the data structure;
   injecting data-structure bookkeeping code into the at least one object-adding program element and the at least one object-removing program element, the data-structure bookkeeping code operating to track a change in a size of the data structure with a reference to a corresponding location in an execution path of the computer program;
   executing the computer program with the injected data-structure bookkeeping code to determine a first cumulative change in the size of the data structure at a first location in the execution path of the computer program by summing tracked changes at the first location; and
   using the first cumulative change to identify the first location as a source of the memory leak in the data structure, the memory leak corresponding to an increasing allocation of memory beyond a threshold value for leaking memory.

2. The method of claim 1, wherein identifying the first location as the source of a memory leak in the data structure includes comparing the first cumulative value to the threshold value for leaking memory.

3. The method of claim 1, wherein, for a plurality of locations including the first location, executing the computer program includes determining a plurality of cumulative changes in the size of the data structure at the locations by summing tracked changes at each location, and the method further comprises:
   using a combination of the cumulative changes to identify a combination of the locations as a combined source of the memory leak by comparing the combination of the cumulative changes to the threshold value for leaking memory, the combination of the locations including the first location.

4. The method of claim 1, wherein the data-structure bookkeeping code includes operations for:
   identifying an of type for each object added to the data structure or removed from the data structure; and restricting the tracking of changes in the size of the data structure to a restricted set of one or more object types.

5. The method of claim 1, wherein the data-structure bookkeeping code in a first program element includes operations for:
incrementing or decrementing a counter to track a number of objects added to the data structure or removed from the data structure in the first program element; and
using the counter to restrict the tracking of changes in the size of the data structure so that changes are tracked for a restricted set of counter values.

6. The method of claim 1, wherein the data-structure bookkeeping code in a first program element includes operations for:
incrementing or decrementing a counter to track a number of objects added to the data structure or removed from the data structure in the first program element; and
using the counter to restrict the tracking of changes in the size of the data structure so that changes are tracked for counter values that are greater than a threshold counter value.

7. The method of claim 1, further comprising:
identifying at least one object-creating program element that creates an object for the data structure;
injecting object-creation bookkeeping code into the at least one object-creating program element, the object-creation bookkeeping code operating to track a location in the execution path of the computer program where an object is created for the data structure;
executing the computer program with the object-creation bookkeeping code to determine a cumulative number of objects created at a second location in the execution path of the computer program by counting a plurality of objects created at the second location; and
identifying the second location as an object-creating source of the memory leak by relating the first location to the second location.

8. The method of claim 1, further comprising:
tracing the execution path of the computer program to determine the first location as an element of a stack trace.

9. The method of claim 1, wherein the computer program is a Java computer program that includes a collection interface, the collection interface including a method to determine the size of the data structure, a method to add one or more objects to the data structure, and a method to remove one or more objects from the data structure.

10. A non-transitory computer-readable medium that stores a memory-leak program to identify a memory leak in a data structure, the memory-leak program including instructions that, when executed by a computer, cause the computer to perform operations comprising:
accessing a listing of a computer program, the computer program including program elements that create the data structure and operate on the data structure to include one or more objects as components of the data structure;
identifying at least one object-adding program element that adds at least one object to the data structure and at least one object-removing program element that removes at least one object from the data structure;
injecting data-structure bookkeeping code into the at least one object-adding program element and the at least one object-removing program element, the data-structure bookkeeping code operating to track a change in a size of the data structure with a reference to a corresponding location in an execution path of the computer program;
executing the computer program with the injected data-structure bookkeeping code to determine a first cumulative change in the size of the data structure at a first location in the execution path of the computer program by summing tracked changes at the first location; and
using the first cumulative change to identify the first location as a source of the memory leak in the data structure, the memory leak corresponding to an increasing allocation of memory beyond a threshold value for leaking memory.

11. The computer-readable medium of claim 10, wherein identifying the first location as the source of a memory leak in the data structure includes comparing the first cumulative value to the threshold value for leaking memory.

12. The computer-readable medium of claim 10, wherein, for a plurality of locations including the first location, executing the computer program includes determining a plurality of cumulative changes in the size of the data structure at the locations by summing tracked changes at each location, and the memory-leak program further includes instructions that, when executed by the computer, cause the computer to perform operations comprising:
using a combination of the cumulative changes to identify a combination of the locations as a combined source of the memory leak by comparing the combination of the cumulative changes to the threshold value for leaking memory, the combination of the locations including the first location.

13. The computer-readable medium of claim 10, wherein the data-structure bookkeeping code includes operations for:
identifying an object type for each object added to the data structure or removed from the data structure; and
restricting the tracking of changes in the size of the data structure to a restricted set of one or more object types.

14. The computer-readable medium of claim 10, wherein the memory-leak program further includes instructions that, when executed by the computer, cause the computer to perform operations comprising:
identifying at least one object-creating program element that creates an object for the data structure;
injecting object-creation bookkeeping code into the at least one object-creating program element, the object-creation bookkeeping code operating to track a location in the execution path of the computer program were an object is created for the data structure;
executing the computer program with the object-creation bookkeeping code to determine a cumulative number of objects created at a second location in the execution path of the computer program by counting a plurality of objects created at the second location; and
identifying the second location as an object-creating source of the memory leak by relating the first location to the second location.

15. The computer-readable medium of claim 10, wherein the memory-leak program further includes instructions that, when executed by the computer, cause the computer to perform operations comprising:
tracing the execution path of the computer program to determine the first location as an element of a stack trace.

16. The computer-readable medium of claim 10, wherein the computer program is a Java computer program that includes a collection interface, the collection interface including a method to determine the size of the data structure, a method to add one or more objects to the data structure, and a method to remove one or more objects from the data structure.

17. An apparatus configured to identify a memory leak in a data structure, the apparatus comprising a computer configured to perform operations for computer-implemented modules including:

a computer-program-listing module that accesses a listing of a computer program, the computer program including program elements that create the data structure and operate on the data structure to include one or more objects as components of the data structure;

a program-element-identification module that identifies at least one object-adding program element that adds at least one object to the data structure and at least one object-removing program element that removes at least one object from the data structure;

a code-injection module that injects data-structure bookkeeping code into the at least one object-adding program element and the at least one object-removing program element, the data-structure bookkeeping code operating to track a change in, a size of the data structure with a reference to a corresponding location in an execution path of the computer program;

an execution module that executes the computer program with the injected data-structure bookkeeping code to determine a first cumulative change in the size of the data structure at a first location in the execution path of the computer program by summing tracked changes at the first location; and a memory-leak-identification module that uses the first cumulative change to identify the first location as a source of the memory leak in the data structure, the memory leak corresponding to an increasing allocation of memory beyond a threshold value for leaking memory.

18. The method of claim 1, wherein in an execution of the computer program with the injected data-structure bookkeeping code, the data-structure bookkeeping code operates to store the tracked changes at the first location in a change-tracking data structure that references the tracked changes at the first location to the first location, and the first cumulative change in the size of the data structure at the first location is determined by accessing the change-tracking data structure to sum the tracked changes at the first location.

19. The method of claim 1, wherein for each change in the size of the data structure from the at least one object-adding program element and the at least one object-removing program element, the data-structure bookkeeping code operates to identify a respective corresponding location in the execution path of the computer program and further operates to track said each change in the size of the data structure with a respective reference to the respective corresponding location in the execution path of the computer program.

20. The method of claim 1, wherein the corresponding location in the execution path of the computer program is associated with a program call to the at least one object-adding program element or the at least one object-removing program element.

21. The method of claim 1, wherein the data-structure bookkeeping code associates the change in the size of the data structure with the reference to the corresponding location in the execution path of the computer program, the reference to the corresponding location being determined as a stack trace from the execution path of the computer program.

* * * * *